United States Patent
Horiguchi et al.

(10) Patent No.: US 8,290,699 B2
(45) Date of Patent: Oct. 16, 2012

(54) SYSTEM AND METHOD FOR GEOGRAPHIC INTERPOLATION OF TRAFFIC DATA

(75) Inventors: Sadanori Horiguchi, Novi, MI (US);
Kimiyoshi Machii, Novi, MI (US);
Manabu Kato, Mirai (JP)

(73) Assignee: Clarion Co., Ltd., Saitama (JP)

( * ) Notice: Subject to any disclaimer, the term of this patent is extended or adjusted under 35 U.S.C. 154(b) by 1389 days.

(21) Appl. No.: 11/863,947

(22) Filed: Sep. 28, 2007

(65) Prior Publication Data
US 2009/0088963 A1 Apr. 2, 2009

(51) Int. Cl.
G01C 21/00 (2006.01)
G08G 1/123 (2006.01)
G08G 1/00 (2006.01)
G06F 19/00 (2011.01)
G06G 7/70 (2006.01)
G06G 7/76 (2006.01)

(52) U.S. Cl. .......... 701/409; 701/532; 701/117
(58) Field of Classification Search .......... 701/200, 701/201, 204, 209, 409, 410, 117, 118, 119, 701/120; 340/944, 988, 995.1, 995.11, 995.13, 340/995.14, 995.18, 995.19
See application file for complete search history.

(56) References Cited

U.S. PATENT DOCUMENTS

| | | | |
|---|---|---|---|
| 5,182,555 A * | 1/1993 | Sumner .......... | 340/905 |
| 5,862,510 A * | 1/1999 | Saga et al. .......... | 701/211 |
| 6,128,573 A * | 10/2000 | Nomura .......... | 701/208 |
| 6,216,088 B1 * | 4/2001 | Schulz et al. .......... | 701/209 |
| 6,603,405 B2 * | 8/2003 | Smith .......... | 340/905 |
| 7,890,258 B2 * | 2/2011 | Endo et al. .......... | 701/209 |
| 2001/0029425 A1 * | 10/2001 | Myr .......... | 701/200 |
| 2001/0047242 A1 * | 11/2001 | Ohta .......... | 701/210 |
| 2002/0085014 A1 * | 7/2002 | Yuda et al. .......... | 345/582 |
| 2003/0045997 A1 * | 3/2003 | Nakane et al. .......... | 701/202 |
| 2003/0069683 A1 * | 4/2003 | Lapidot et al. .......... | 701/117 |
| 2004/0088107 A1 * | 5/2004 | Seligmann .......... | 701/204 |
| 2005/0053902 A1 | 3/2005 | Vladimirovich | |
| 2006/0106534 A1 * | 5/2006 | Kawamata et al. .......... | 701/208 |
| 2007/0179708 A1 * | 8/2007 | Sekine et al. .......... | 701/208 |
| 2010/0199213 A1 * | 8/2010 | Suzuki .......... | 715/784 |

* cited by examiner

Primary Examiner — Ronnie Mancho
Assistant Examiner — Nicholas Kiswanto
(74) Attorney, Agent, or Firm — Gifford, Krass, Sprinkle, Anderson & Citkowski, P.C.

(57) ABSTRACT

A method for geographic interpolation of traffic data in a vehicle navigation system in which the navigation system includes a map database divided into geographic meshes. Each mesh includes a plurality of road links of different types. That data also includes a first set of meshes containing traffic flow data while a mutually exclusive second set of meshes contains no such traffic flow data. A border between the first and second set of meshes is first identified and thereafter a blend zone of blend meshes is created by selecting at least one mesh adjacent the border so that the blend mesh is interposed between the first and second set of meshes. Thereafter, the traffic data for each type of road link in the blend mesh is adjusted to a value intermediate the first and second set of adjacent meshes for each type of road link and the blend mesh data is then stored.

19 Claims, 5 Drawing Sheets

SYSTEM AND METHOD FOR GEOGRAPHIC INTERPOLATION OF TRAFFIC DATA

BACKGROUND OF THE INVENTION

I. Field of the Invention

The present invention relates generally to navigation systems and, more particularly, to a navigation system with means for geographic interpolation of traffic data.

II. Description of Related Art

Navigation systems of the type used in automotive vehicles have enjoyed increased popularity in recent years. Such navigation systems are particularly useful for providing route information on a display screen visible to the operator of the motor vehicle. In order to obtain the directions to a desired destination, the operator of the motor vehicle typically inputs the address of the destination by a touch screen or other means. After the destination has been inputted to the navigation system, it then computes the desired route which is typically the fastest route between the current location of the vehicle and the destination.

In order for the navigation system to compute the route from the current location of the vehicle and to the destination, these previous navigation systems have included a map database which includes map data used in the route calculations. Such map data typically comprises a plurality of meshes wherein each mesh is assigned a predetermined geographic area. The map data in each mesh includes not only the position, length, speed limit, etc. for each road link, but also the type of road, e.g. interstate highway, two lane road, etc., for each road link.

In order to achieve the highest degree of accuracy, e.g. minimum travel time, in the route calculations to the destination, ideally traffic flow data, e.g. real-time data or statistical data, is available for each road link in each mesh. Such statistical data may be obtained by the navigation system in any of numerous known fashions.

Unfortunately, traffic flow data for many geographic areas is unavailable. Consequently, navigation systems have utilized the speed limit for the various road links in the meshes which do not contain traffic flow data when performing route calculations.

Such calculations of route data based upon the speed limit in meshes which do not contain traffic flow data but in which the speed limit is defined, however, have proven somewhat inaccurate in operation. In particular, the vehicle speed on any given road link is typically, but not always, less than the posted speed limit for the road link. Consequently, since the previously known navigation systems statically preassign a speed value derived from the speed limit for road links of the same type in meshes which do not contain traffic flow data when performing route calculations, errors may occur resulting in inaccurate routing of the optimal route between the location of the vehicle and the destination.

SUMMARY OF THE PRESENT INVENTION

The present invention provides both a method and system which overcomes the above-mentioned disadvantages of the previously known methods and systems.

In brief, the navigation system of the present invention includes a map database which is divided into adjacent and mutually exclusive geographic meshes. Each mesh contains a plurality of road links of different types of roads. Furthermore, a first set of meshes contains traffic flow data while a mutually exclusive second set of meshes contain primarily statically preassigned speed values for the road links.

The system first identifies one or more borders between the first and second set of meshes in the area of interest between a starting location and a destination location. Typically, the meshes containing traffic flow data will correlate to the more populous areas whereas the second set of meshes which do not contain traffic flow data will correspond to more sparsely populated areas.

Thereafter, the system creates a zone of blend meshes from either the first or second set by selecting at least one mesh adjacent the border. Following the selection and creation of the blend meshes, the blend meshes are interposed between the first and second set of meshes.

The system then adjusts the traffic data for each type of road link in the blend meshes to a value between the adjacent meshes in a first set of meshes and the adjacent meshes in the second set of meshes for each type of road link. The adjusted traffic data is then stored by the navigation system and utilized for route calculations for routes traveling through the newly created zone of blend meshes.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
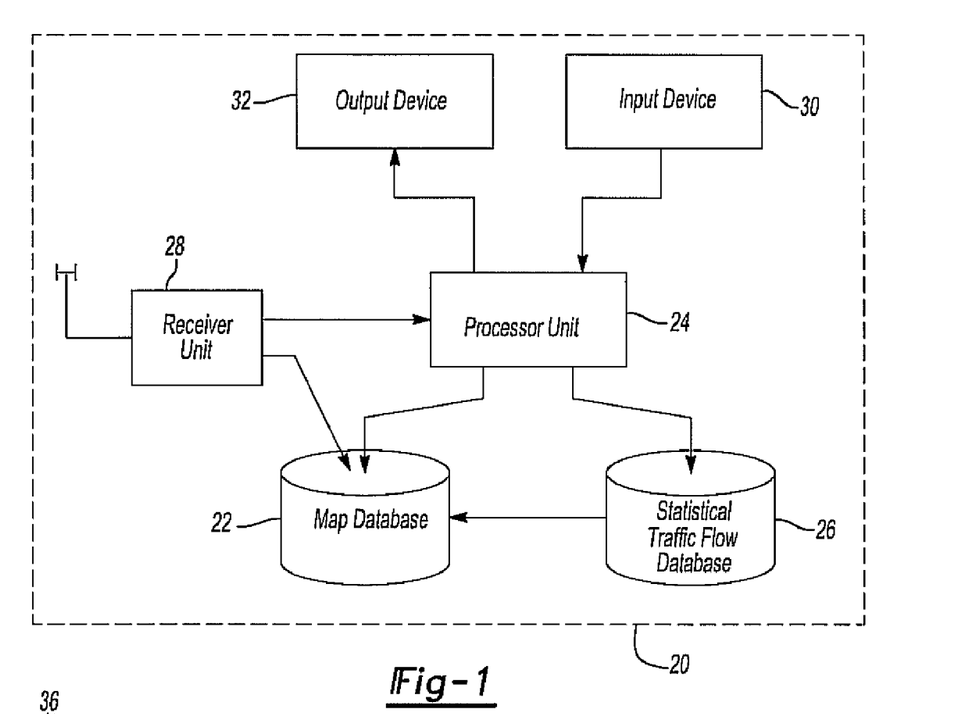
FIG. 1 is a block diagrammatic view illustrating a preferred embodiment of the system of the present invention.

With reference first to FIG. 1, a simplified block diagrammatic view of a navigation system 20 according to the present invention is illustrated. The navigation system 20 includes a map database 22 which contains information relating to road links. Such information also includes the type of road link. For example, an interstate highway constitutes one type of road link whereas a two lane paved road constitutes a different type of road link and so on. The map database 22 also contains information relating to speed values preassigned according to the link road type, often derived from the typical speed limits for the road link type.

The information in the map database 22 is accessed by a processor 24 when calculating the position of the vehicle and also performing route calculations between the position of the automotive vehicle containing navigation system 20 and the vehicle destination. The processor 24 also accesses a statistical traffic flow database 26 which contains statistical or historical traffic flow information for various road links within the area of interest. The database 26 may also contain weather and/or time of day information.

The information contained in the traffic flow database may be obtained in any of several different manners. For example, the database 26 may be built into the navigation system. Alternatively, or additionally, the navigation system 20 may include a receiver 28 which receives traffic flow data and provides that data as input to the processor 24. The processor 24 then optionally uses that received data to update the statistical or historical traffic flow database 26. Furthermore, the traffic flow data received by the receiver unit 28 may originate from satellite radio, Internet servers, cell phone transmissions, terrestrial radio broadcasting, and the like.

The navigation system 20 also includes an input device 30 which inputs information to the processor 24. Such information can include, for example, the destination of the automotive vehicle.

Similarly, the navigation system 20 includes an output device 32 which outputs information, such as the preferred route to the destination, to the operator of the motor vehicle. Typically, the output device comprises a video display while the input device 30 comprises a touch screen on that display. However, other types of input devices 30, such as a keypad, mouse, joystick, etc., and output devices 32 such as a CRT may be utilized without deviation from the scope or spirit of tie invention.

Figure 2:
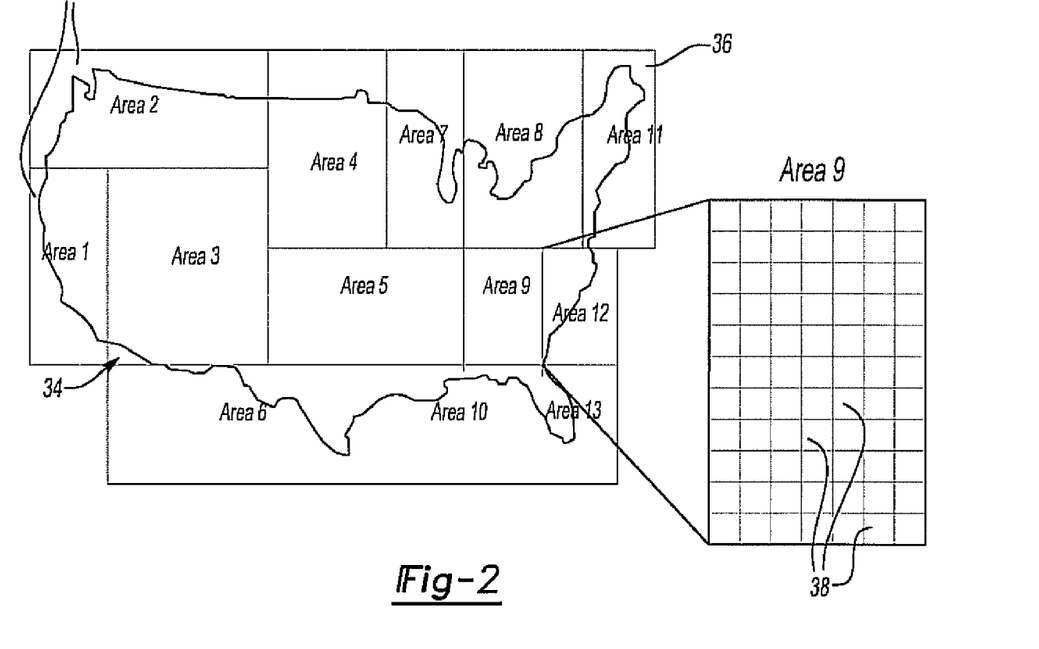
FIG. 2 is a diagrammatic view illustrating the database structure of the map database.

With reference now to FIG. 2, the map database 22 contains information relating to various geographic areas, such as the geographic area 34 illustrated in FIG. 2 as the contiguous continental United States. This geographic area 34 in turn is divided into various different geographic areas 36.

Each area 36 is divided into a plurality of meshes 38. Each mesh 38, furthermore, is preferably of a predetermined longitudinal and lateral distance. The meshes 38 are also arranged so that the meshes 38 are adjacent and mutually exclusive of each other.

Figure 3:
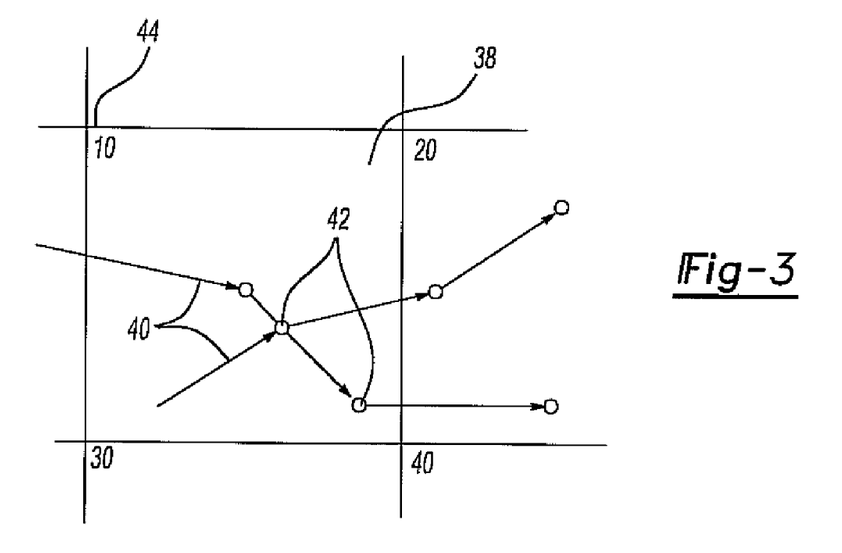
FIG. 3 is an enlarged view illustrating a single mesh of the map database.

An exemplary mesh 38 is illustrated in FIG. 3. The mesh 38 includes a plurality of road links 40 where each road link 40 extends between two nodes 42. Each mesh 38 contains an identification 44 which is stored in the map database 22 together with tie road links 40 and other information concerning the road links 40. Such information includes the type of road link 40, i.e. an interstate road link, a two lane road link, an unpaved road, etc.

Figure 4:
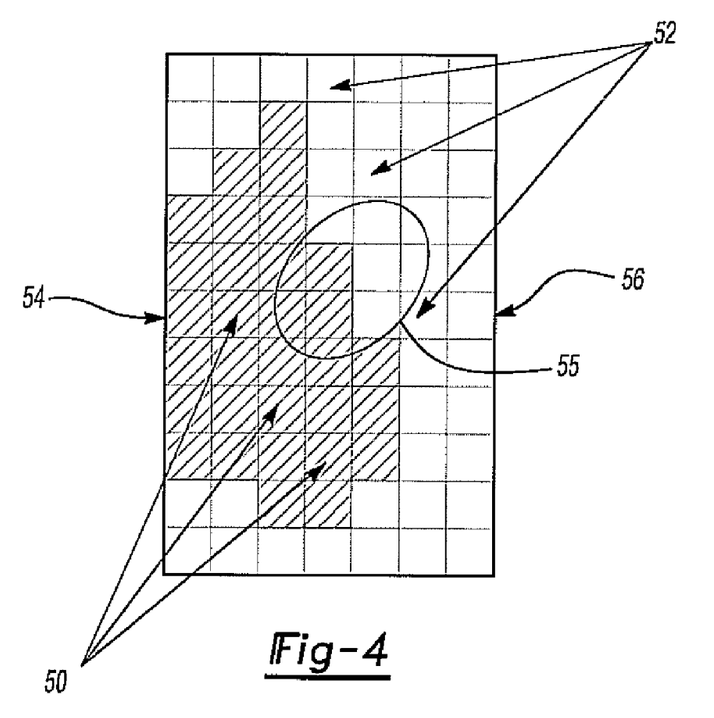
FIG. 4 is a view illustrating a plurality of meshes, some of which contain statistical data and the others which do not.

With reference now to FIG. 4, many of the meshes 38 stored in the map database 22 of the navigation system 20 include traffic flow information for the various road links within the mesh. The meshes for which traffic flow information is available and stored in the statistical traffic flow database 26 are illustrated as crosshatched meshes 50 in FIG. 4.

Conversely, there are many meshes 52 which contain only preassigned traffic data. Such preassigned traffic data is typically derived from the speed limit for the various different types of road links within the meshes 52 without traffic flow data or only very limited statistical data. For example, the actual speed limit data for a particular road link may not be contained in the map database. In that event, the speed limit for the road link is assigned as a function of the type of road link.

The meshes with traffic flow data 50 as well as the meshes without traffic flow data 52 are all mutually exclusive of each other. Furthermore, the meshes 50 with traffic flow data form a first set 54 of meshes while the meshes 52 without traffic flow data form a second set 56 of meshes 38.

Typically, the first set 54 of meshes with traffic flow data cover the more populous geographic areas while the second set 56 of meshes 52 without traffic flow data cover the more sparsely populated geographic areas. Furthermore, a border 58 is defined between the first set 54 of meshes 50 with traffic flow data and the second set 56 of meshes 52 without traffic flow data.

Figure 5:
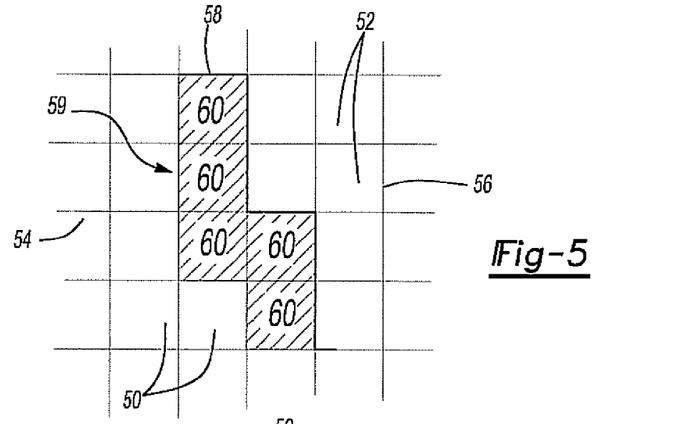
FIG. 5 is an enlarged view illustrating a portion shown in circle 5-5 in FIG. 4 and enlarged for clarity.

With reference now to FIG. 5, an enlarged view of a portion of the border 58 between the first set 54 and second set 56 of meshes is shown. A plurality of meshes are then selected along the border 58 to form a blend zone 59 of blend meshes 60 along the border 58 so that the blend meshes 60 are interposed or positioned between the first set 54 of the meshes which contain traffic flow data and the second set 56 of meshes which do not.

The blend zone 59 of the blend meshes 60 is illustrated in FIG. 5 is selected from the first set of meshes 54 along the border 58, i.e. the meshes 54 which contain traffic flow data. However, the blend meshes 60 which form the blend zone 59 may alternatively be selected from the second set 56 of meshes 52 which do not contain traffic flow data.

Figure 6:
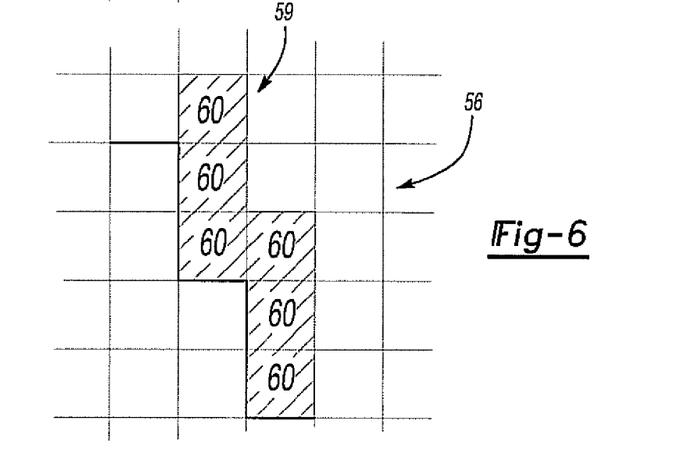
FIG. 6 is a view similar to FIG. 5, but illustrating a modification thereof.
Figure 7:
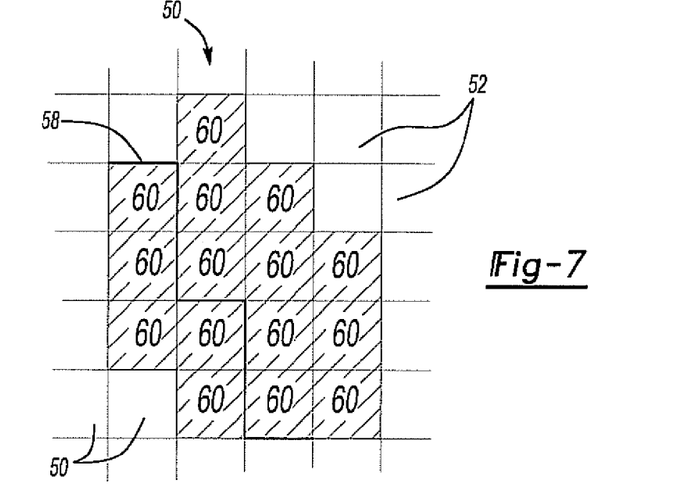
FIG. 7 is a view similar to both FIGS. 5 and 6 but illustrating still a further modification thereof.

The blend zones 59 formed by the blend meshes 60 in both FIGS. 5 and 6 are illustrated as a single mesh width along the border 58. However, as shown in FIG. 7, the blend meshes 60 which form the blend zone 59 may have a multiple mesh width and may also be selected from meshes 50 and 52 on either side of the border 58. Similarly, one or more meshes may be selected on either side of the border 58 to form the blend zone as also shown in FIG. 7.

Regardless of how the blend meshes 60 are selected to form the blend zone 59, the traffic flow data for the different types of road links in each of the blend meshes 60 in the blend zone 59 is modified to a value intermediate tie traffic flow data for road links of the same type in the meshes 50 having traffic flow data and the corresponding types of road links in the meshes 52 without traffic flow data. By thus modifying the traffic flow data in the blend meshes 60, a more accurate route prediction for navigation of the vehicle is achieved.

Figure 8:
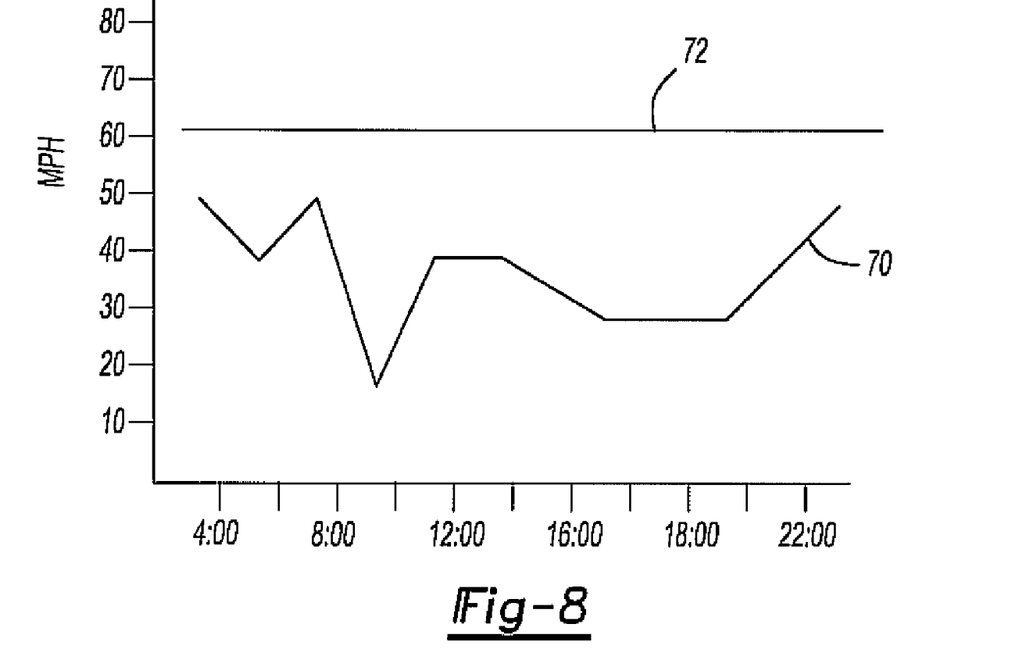
FIG. 8 is a graph illustrating one embodiment of the present invention.

The traffic flow or road link data for the blend meshes 60 in the blend zone 58 may be modified in any of several different fashions. For example, with reference to FIG. 8, graph 70 illustrates the traffic flow for a particular road link in a mesh 50 having traffic flow data. The graph 70, furthermore, varies as a function of a third parameter such as time of day, weather or the like. Conversely, graph 72 illustrates the traffic flow data for the same road link, such as an interstate highway in a mesh 52 which does not contain traffic flow data. Unlike the graph 70, the graph 72 remains constant, namely a preassigned speed value, as a function of the third parameter because there is no traffic flow data.

Figure 9:
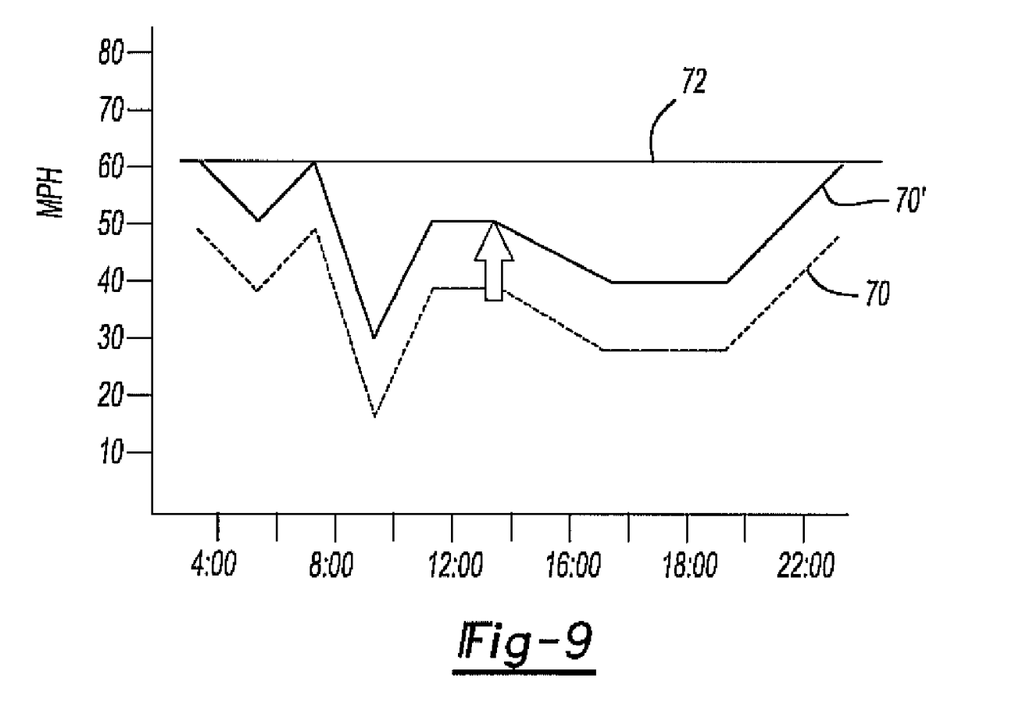
FIG. 9 is a graph illustrating the adjustment of the blend meshes in the blend zone utilizing a preferred embodiment of the present invention.

With reference now to FIG. 9, in order to adjust the traffic flow data for the particular types of road link, the graph 70 is shifted upwardly to the position shown at 70'. In doing so, the traffic flow data 70' is set to a value between the traffic flow data illustrated by graph 70 and the preassigned speed value graph 72 of the meshes having no traffic flow data. As such, the adjusted traffic flow graph 70', which is subsequently stored by the navigation system, achieves a smoother transition between the areas containing traffic flow data and those that do not. A closer approximation of the actual traffic flow in the blend zone 59 may be achieved which in turn improves the accuracy of route calculations as well as the unnecessary avoidance of areas containing traffic flow data.

Figure 10:
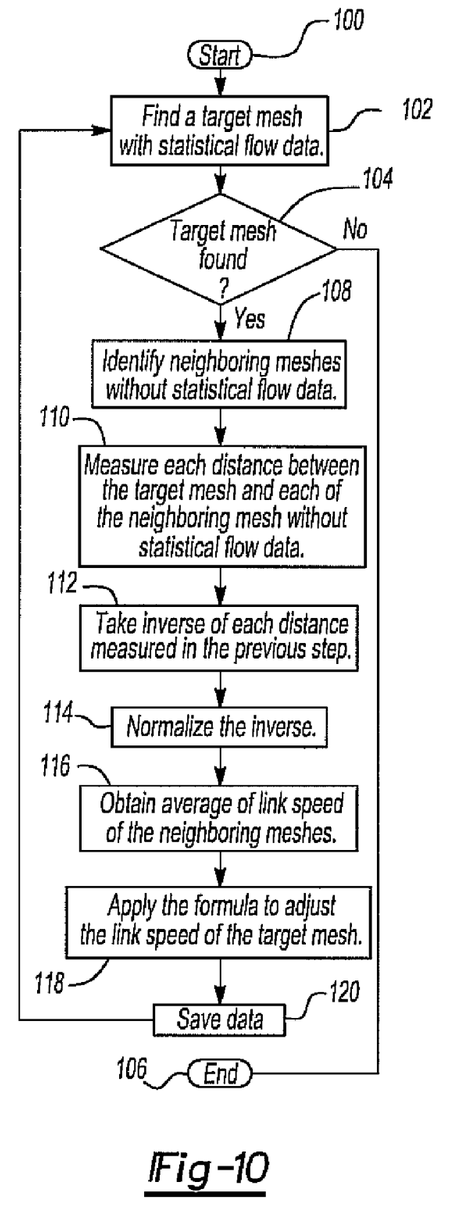
FIG. 10 is a flowchart illustrating the operation of still a further embodiment of the present invention.

Alternatively, the traffic flow data for the blend meshes 60 in the blend zone 59 may be calculated as a difference between the statically defined link travel speed and the average of the statistical flow speeds for that particular link in the following fashion:

$$SS = w1(SS) + w2\Sigma wi(\overline{LS})$$

where
- SS: statistical flow speed
- w1, w2, wi: weight coefficient
- w1+w2=1.0
- wi=normalized inverse of the distances to neighboring meshes without statistical information
- $\overline{LS}$: average link speed of neighboring meshes without statistical flow data With reference now to FIG. 10, a flowchart illustrating the above calculations of the traffic flow data in the blend meshes 60 of the blend zone 59 is illustrated from the method corresponding to FIG. 5, and in which the blend meshes 60 which form the blend zone are selected from the meshes 50 containing statistical data. After the operation start at step 100, step 100 proceeds to step 102 where the method searches for a target mesh having statistical data adjacent or within a predetermined number of meshes away from the border 58. Step 102 then proceeds to step 104.

At step 104, the program determines whether or not a target mesh was found and, if not, step 104 branches to step 106 where the algorithm is terminated. Conversely, assuming that a target mesh is found, step 104 instead branches to step 108.

At step 108, the program identifies all neighboring meshes without statistical flow data, i.e. the meshes 52 along the border 58. Step 108 then proceeds to step 110.

At step 110, the distance between the target mesh and each of the neighboring meshes without flow data is determined. Step 110 then proceeds to step 112. At step 112, the inverse of the distance determined at step 110 is calculated and step 112 proceeds to step 114 where the inverses are then normalized. Step 114 then proceeds to step 116.

At step 116, the average of the link speeds between the neighboring meshes for each different road type is determined and step 116 proceeds to step 118 where the formula to adjust the link speeds for the road types of the target mesh or blend mesh 60 is applied to the target or blend mesh 60. Step 118 then proceeds to step 120 where the new calculated speeds for the blend mesh 60 are saved by the processor 24 (FIG. 1) into the map database 22. Step 120 then branches back to step 102 where the above process is repeated.

Figure 11:
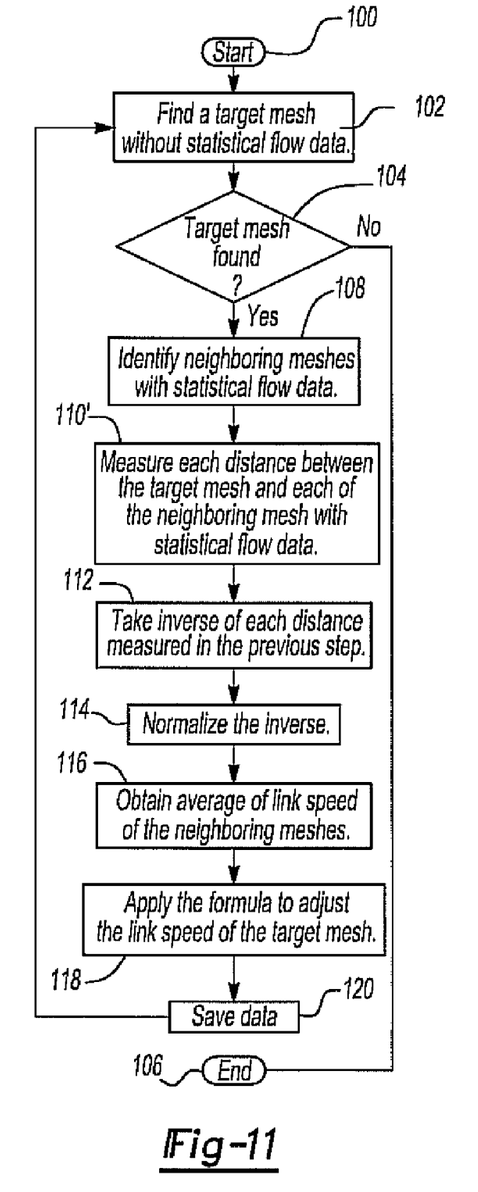
FIG. 11 is a view illustrating still a further embodiment of a preferred embodiment of the present invention.

With reference now to FIG. 11, an algorithm is shown which illustrates the operation of the present invention corresponding to the method illustrated in FIG. 6 in which the blend meshes 60 which form the blend zone 59 are selected from the meshes 52 which do not contain statistical data. The algorithm illustrated in FIG. 11 operates in an identical fashion to that shown in FIG. 10 except that step 110' replaces step 100. Step 110', unlike step 100, measures the distance between the target mesh and each of the neighboring meshes with statistical flow data, rather than without statistical flow data illustrated at step 110 in FIG. 10. Otherwise, FIG. 11 operates in the identical fashion as the algorithm illustrated in FIG. 10 so that a further description is unnecessary.

From the foregoing, it can be seen that the present invention provides a unique method and system for blending traffic flow data along a border between areas having traffic flow data and areas which do not. By forming a blend zone along the border and then altering the traffic flow data within that blend zone to an amount intermediate the amount with the meshes containing traffic flow data and meshes which do not for each road type, more accurate route predictions and the unnecessary avoidance of areas containing traffic flow data may be achieved where the route extends through areas containing traffic flow data as well as areas that do not.

Having described our invention, however, many modifications thereto will become apparent to those skilled in the art to which it pertains without deviation from the spirit of the invention as defined by the scope of the appended claims.

We claim:

1. For use with a vehicle navigation system having a map database divided into geographic meshes, each mesh containing a plurality of road links of different types, wherein a first set of said meshes contain traffic flow data while a mutually exclusive second set of said meshes contain primarily statistically preassigned speed values, a method for geographic interpolation of traffic data comprising the steps of:
   - identifying one or more borders between said first set and said second set of said meshes,
   - creating a zone of blend meshes from one of said first and second sets of meshes by selecting at least one mesh adjacent each said border so that said blend meshes are interposed between said first and said second set of meshes,
   - adjusting the traffic data for each type of road link in the blend meshes to a value between adjacent meshes in said first set of meshes and adjacent meshes in said second set of meshes for each type of road link,
   - storing said adjusted traffic data for said blend meshes.

2. The method as defined in claim 1 wherein said blend meshes are selected from said first set of meshes.

3. The method as defined in claim 1 wherein said blend meshes are selected from said second set of meshes.

4. The method as defined in claim 1 wherein said creating step further comprises the step of selecting a plurality of meshes adjacent each said border to form said blend meshes.

5. The method as detailed in claim 1 wherein said first set of meshes contains road link data for each type of road link which varies as a function of a further parameter and wherein said adjusting step further comprises the step of adjusting the traffic data in said blend meshes as a function of said further parameter.

6. The method as defined in claim 5 wherein said further parameter comprises time of day.

7. The method as defined in claim 5 wherein said further parameter comprises different types of weather conditions.

8. The method as defined in claim 1 wherein said adjusting step further comprises the step of adjusting the traffic data in said blend meshes as a function of distance across said blend meshes between said first and said second set of meshes.

9. A vehicle navigation system having a map database divided into geographic meshes, each mesh containing a plurality of road links of different types, wherein a first set of said meshes contain traffic flow data while a mutually exclusive second set of said meshes contain primarily statically preassigned speed values, apparatus for geographic interpolation of traffic data comprising:
   - means for identifying one or more borders between said first set and said second set of said meshes,
   - means for creating a zone of blend meshes from one of said first and second sets of meshes by selecting at least one mesh adjacent each said border so that said blend meshes are interposed between said first and said second set of meshes,
   - means for adjusting the traffic data for each type of road link in the blend meshes to a value between adjacent meshes in said first set of meshes and adjacent meshes in said second set of meshes for each type of road link, means for storing said adjusted traffic data for said blend meshes.

10. The system as defined in claim 9 wherein said blend meshes are selected from said first set of meshes.

11. The system as defined in claim 9 wherein said blend meshes are selected from said second set of meshes.

12. The system as defined in claim 9 wherein said means for creating further comprises means for selecting a plurality of meshes adjacent each said border to form said blend meshes.

13. The system as defined in claim 9 wherein said first set of meshes contains road link data for each type of road link which varies as a function of a further parameter and wherein said means for adjusting further comprises means for adjusting the traffic data in said blend meshes as a function of said further parameter.

14. The system as defined in claim 13 wherein said further parameter comprises time of day.

15. The system as defined in claim 13 wherein said further parameter comprises different types of weather conditions.

16. The system as defined in claim 9 wherein said means for adjusting further comprises means of adjusting the traffic data in said blend meshes as a function of distance across said blend meshes between said first and said second set of meshes.

17. For use with a map database divided into geographic meshes, each mesh containing a plurality of road links of different types, wherein a first set of said meshes contain traffic flow data while a mutually exclusive second set of said meshes contain primarily statically preassigned speed values, a method for geographic interpolation of traffic data comprising the steps of:

identifying one or more borders between said first set and said second set of said meshes, creating a zone of blend meshes from one of said first and second sets of meshes by selecting at least one mesh adjacent each said border so that said blend meshes are interposed between said first and said second set of meshes, adjusting the traffic data for each type of road link in the blend meshes to a value between adjacent meshes in said first set of meshes and adjacent meshes in said second set of meshes for each type of road link, storing said adjusted traffic data for said blend meshes.

18. The method as defined in claim 17 wherein said blend meshes are selected from said first set of meshes.

19. The method as defined in claim 17 wherein said blend meshes are selected from said second set of meshes.

* * * * *

UNITED STATES PATENT AND TRADEMARK OFFICE
CERTIFICATE OF CORRECTION

| | | |
|---|---|---|
| PATENT NO. | : 8,290,699 B2 | Page 1 of 1 |
| APPLICATION NO. | : 11/863947 | |
| DATED | : October 16, 2012 | |
| INVENTOR(S) | : Sadanori Horiguchi et al. | |

It is certified that error appears in the above-identified patent and that said Letters Patent is hereby corrected as shown below:

On the Title Page:

Item (73) Assignee, Delete "Clarion Co., Ltd.", Insert --Xanavi Informatics Corporation--

In the Specification:

At column 1, line number 49, Delete "statically", Insert --statistically--

At column 1, line number 67, Delete "statically", Insert --statistically--

At column 3, line number 49, Delete "tie", Insert --the--

At column 4, line number 22, Delete "is", Insert --as--

At column 4, line number 39, Delete "tie", Insert --the--

At column 5, line number 5, Delete "statically", Insert --statistically--

In the Claims:

At column 6, line number 56, Delete "statically", Insert --statistically--

At column 8, line number 5, Delete "statically", Insert --statistically--

Signed and Sealed this
Fifth Day of May, 2015

Michelle K. Lee
*Director of the United States Patent and Trademark Office*